Patented Nov. 6, 1945

2,388,618

UNITED STATES PATENT OFFICE 2,388,618

RUBBER LUBRICATING AND PLASTICIZING COMPOSITION

Morris Omansky, Brookline, Mass., assignor, by mesne assignments, to Victor Chemical Works, Chicago, Ill., a corporation of Illinois No Drawing. Application December 3, 1941, Serial No. 421,518

8 Claims. (Cl. 260—23)

This invention relates to a rubber lubricating and plasticizing composition, and more particularly to compositions of natural or synthetic rubber including a plasticizing proportion of a phosphated castor oil compound.

In the preparation of rubber stock for most of the common uses, such as for tire treads, it is customary to incorporate appropriate amounts of pine tar and stearic acid or their equivalents to give desirable plasticity characteristics in the finished products. Efforts have been made to improve these characteristics, as well as those of the rubber stock and the vulcanized product generally, but without significant commercial success.

A phosphated castor oil as herein described means one in which at least one OH group of the castor oil has been replaced by a phosphate group.

In accordance with the present invention it has been found that pine tar may be entirely replaced and the plasticizing or lubricating portion of the stearic acid may be replaced by phosphated castor oil compounds. Similarly, the phosphated castor oil products provide an effective plasticizing agent for use in synthetic rubbers.

The term "phosphated castor oil" as used herein includes phosphated castor oil and derivatives thereof formed by neutralization of one or more of the acidic group of the phosphate radical with a base such as a basic sodium ammonium or amine compound. The modified compounds may be considered as neutralized or partially neutralized phosphated castor oil. In general the amino derivatives have given the best results, but the results with the other castor oil compounds are good and may be preferable for other reasons than the plasticizing effect in specific instances.

The neutralization or partial neutralization of the phosphated castor oil may be carried out in advance of the preparation of the rubber composition or the individual ingredients may be mixed with the rubber and allowed to react therewith.

This invention will be more completely described in the following examples, which should be understood as being illustrative rather than limiting.

*Example I*

Formulas for tire tread stock using two different amino derivatives of phosphated castor oil. Parts are by weight.

|  | Formula A | Formula B |
|---|---|---|
| Smoked sheets | 100.0 | 100.0 |
| Alkali tire reclaim | | 20.0 |
| Hard carbon black (Micronex beads) | 45.0 | 50.0 |
| Zinc oxide | 5.0 | 5.0 |
| Accelerator (benzothiazyl disulfide) | 1.0 | 1.0 |
| Antioxidant | 1.5 | 2.0 |
| Sulfur | 2.5 | 3.0 |
| Stearic acid | 2.0 | 2.0 |
| Phosphated castor oil | 0.5 | 1.0 |
| Cyclohexylamine | 0.5 | |
| Triethanolamine | | 1.0 |
| | 158.0 | 185.0 |

In this example, Formula A corresponds in composition to conventional tire tread stocks, except that the latter often contains 4 parts stearic acid and 4 parts pine tar. Hence all the pine tar and half of the stearic acid are replaced by the amino-phosphated castor oil in Formula A. This formula results in a markedly higher grade of tire tread than that obtained by using the conventional formulas. This higher grade is evidenced by greater hardness, elasticity, and wear-resistance, as well as improved modulus including higher tensile strength at break, in the final vulcanized product. And the unvulcanized product also shows distinct improvement over the conventional unvulcanized product of this type with respect to carbon black dispersion, tackiness, lubrication, and plasticity, and hence also to milling conditions.

These superior qualities resulting from the use of Formula A are taken advantage of in Formula B, wherein the quality of the resulting product is reduced to that of standard or conventional products of this type. Quality of the standard is thereby maintained, costs are reduced, and crude rubber is conserved by the use of reclaim.

It will be noted that a part of the conventional amount of stearic acid is retained in the formula of the present invention. This is done for the reason that the stearic acid acts in two ways, physically (as a lubricant), and chemically. The amount which acts chemically, which is in the order of one to two per cent on the amount of rubber, is retained in the formulas of this invention, while that which acts physically is, like the pine tar, replaced by the castor oil derivatives herein described.

It is also possible to prepare the amino-phosphated castor oils before making the rubber mix, as already pointed out. In the present example, for instance, the phosphated castor oil may be mixed with the amine prior to compounding, and the resulting compound added to the mix. The proportions of these reactants may be the same as in the foregoing formulas, or may be varied to suit particular conditions. Thus, three parts phosphated castor oil may be mixed with one part cyclohexylamine (parts being by weight); reaction proceeds, with some evolution of heat. No special conditions such as added heat or pressure are required. The resulting product is a light yellow, very viscous and adhesive mass of the general consistency of cold molasses; its working properties in rubber are excellent. Similar procedure may be followed in preparing the derivatives of other modified castor oils referred to herein.

While the amino compounds of phosphated castor oil are generally preferred in carrying out the present invention; other derivatives of phosphated castor oil, as well as these various modified castor oils themselves, may be used with good results. Formulas embodying several of these materials are given below in Examples II and III.

*Example II*

Formula for tire tread stock using an ammonium salt of phosphated castor oil. Parts are by weight.

| | |
|---|---|
| Smoked sheets | 20.0 |
| Carbon black | 9.0 |
| Zinc oxide | 1.0 |
| Mercaptobenzothiazole (accelerator) | 0.2 |
| Tetramethylthiuram disulfide (accelerator) | 0.02 |
| Antioxidant | 0.3 |
| Sulfur | 0.5 |
| Stearic acid | 0.6 |
| Ammonium salt of phosphated castor oil | 0.1 |
| | 31.72 |

The ratio of ammonia to phosphated castor oil in preparing this last named ingredient is such as to neutralize the product.

*Example III*

Formula for tire tread stock using phosphated castor oil. Parts are by weight.

| | |
|---|---|
| Smoked sheets | 20.0 |
| Carbon black | 10.0 |
| Zinc oxide | 1.0 |
| Benzothiazyl disulfide (accelerator) | 0.2 |
| Diphenyl guanidine (accelerator) | 0.1 |
| Antioxidant | 0.4 |
| Sulfur | 0.55 |
| Stearic acid | 0.2 |
| Phosphated castor oil | 0.6 |
| | 33.05 |

The foregoing examples illustrate the advantages of this invention in the preparation and manufacture of tire tread stock, which is the largest outlet for rubber and hence offers the most extensive field of utility of this procedure. However, those skilled in this art will readily understand from the present disclosure the applicability of this invention in the preparation and manufacture of rubber mixes and products for other purposes.

As will be noted, the amount of phosphated castor oil compound required for the plasticizing of natural rubber is relatively small. In general the amounts used will be between 0.1% and 1%. Less amounts than 0.1% exert, under proper conditions, noticeable plasticizing effects, but amounts below 0.1% are not preferred. Amounts larger than 1% are permissible, but are usually unnecessary with natural rubber.

In the case of synthetic rubbers, the amount of plasticizer required varies somewhat, depending upon the type of synthetic rubber. Prior to the present invention it was considered good practice to use as much as 50% of plasticizer in some of these compounds. For example, the product known as "Hycar" is not sufficiently plastic for efficient processing and the use of 50% of a plasticizer such as dibutyl phthalate with this material is considered good practice. The use of such a large quantity of plasticizer sacrifices some of the desirable rubbery effects of the material without obtaining fully satisfactory working properties. The phosphated castor oil products of the present invention can be used in much smaller proportions and even in these smaller proportions produce better plasticizing effects than any other material heretofore available.

For example effective plasticizing is produced with as little as 5% of the cyclohexylamine derivative of phosphated castor oil. The use of 15% of this plasticizer produces better plasticizing than any quantity of any other available plasticizer heretofore available. The cyclohexylamine derivative is prepared by reacting three parts by weight of phosphated castor oil with one part by weight of cyclohexylamine.

The following table indicates comparative formulae for synthetic rubber compounds, in three of which phosphated castor oil derivatives were employed as plasticizers, and in the fourth of which brown factice was used as a standard of comparison:

*Example IV*

| | Formula | | | |
|---|---|---|---|---|
| | I | II | III | IV |
| Hycar O. R. | 100.0 | 100.0 | 100.0 | 100.0 |
| Hard carbon black | 50.0 | 50.0 | 50.0 | 50.0 |
| Zinc oxide | 5.0 | 5.0 | 5.0 | 5.0 |
| Stearic acid | 0.5 | 0.5 | 2.0 | 0.5 |
| Benzothiazyl disulfide | 1.0 | 1.0 | 1.0 | 1.0 |
| Phenylbetanaphthylamine | 1.0 | 1.0 | 1.0 | 1.0 |
| *Plasticizers* | | | | |
| Cyclohexylamine reaction product with phosphated castor oil | 15.0 | | | |
| Triethanolamine reaction product with phosphated castor oil | | 15.0 | | |
| Phosphated castor oil | | | 15.0 | |
| Commercial brown factice | | | | 15.0 |
| Totals | 172.5 | 172.5 | 174.0 | 172.5 |

The phosphated castor oil containing Formulae I, II and III mixed and formed very much better than stock IV.

In mixing, the Hycar was passed through a tight cold mill four times and then let run around the mill. The plasticizers were worked in with the carbon black and then the rest of the ingredients were incorporated and mixed to uniformity.

The resulting stocks were each vulcanized in a series of progressively increased cures, and then tested. The results of the best tests of each are given below. Stock III (straight phosphated castor oil) was the most rubbery. It had considerably more stretch than stock IV (as had the other castor oil stocks), greater elasticity, and a tensile strength equal to stock IV within the limits of experimental error.

*Example V*

|  | Stock | | | |
| --- | --- | --- | --- | --- |
|  | I | II | III | IV |
| Best cure | 10' at 312° F. | 20' at 312° F. | 60' at 300° F. | 30' at 312° F. |
| Hardness | 68 | 72 | 78 | 72 |
| Elasticity | 61 | 59 | 50 | 40 |
| Tear resistance | Good | Good | Good | Good |

As will be observed, the amount of plasticizer desirable in synthetic rubbers is considerably higher than in natural rubber. Generally at least 5% of plasticizer is desirable and optimum results are generally obtained with 15% to 30%. Higher amounts may be employed but for ordinary purposes the higher percentages are unnecessary.

The term "a rubber" as used herein, unless specifically limited, indicates not only natural rubber such as Hevea rubber, rubber latex, balata, and the guttas, but also the several kinds of synthetic rubbers such as the chloroprene polymers, butadiene polymers and co-polymers. The Hycar O. R. used in Examples IV and V is an oil resistant rubbery butadiene-acrylonitrile copolymer.

The term "neutralized phosphated castor oil" in the claims hereof means a product in which at least one of the acidic groups of the phosphate radical has been neutralized.

The foregoing detailed description has been given for clearness of understanding only, and no unnecessary limitations should be understood therefrom.

What I claim as new, and desire to secure by Letters Patent, is:

1. A rubber composition of matter comprising a rubber and a plasticizing proportion of a neutralized phosphated castor oil.

2. A rubber composition as set forth in claim 1 in which the rubber is natural rubber.

3. A composition as set forth in claim 1 in which the rubber is natural rubber and the neutralized phosphated castor oil comprises approximately 0.1% to approximately 1% by weight of the rubber.

4. A composition comprising a rubber-like butadiene polymer and a plasticizing proportion of a neutralized phosphated castor oil.

5. A composition as set forth in claim 4 in which the proportion of the neutralized phosphated castor oil is from approximately 5% to approximately 30% by weight of the rubber.

6. A rubber composition comprising a rubber and a plasticizing proportion of an ammonium neutralized phosphated castor oil.

7. A rubber composition comprising a rubber and a plasticizing proportion of an amine neutralized phosphated castor oil.

8. A rubber composition comprising a rubber and a plasticizing proportion of a cyclohexylamine neutralized phosphated castor oil.

MORRIS OMANSKY.